US010541787B2

(12) United States Patent
Byun et al.

(10) Patent No.: US 10,541,787 B2
(45) Date of Patent: Jan. 21, 2020

(54) METHOD AND APPARATUS FOR TRANSMITTING RETRANSMISSION DATA USING HARQ IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,704

(22) PCT Filed: Dec. 15, 2015

(86) PCT No.: PCT/KR2015/013772
§ 371 (c)(1),
(2) Date: Apr. 3, 2018

(87) PCT Pub. No.: WO2017/061662
PCT Pub. Date: Apr. 13, 2017

(65) Prior Publication Data
US 2018/0287743 A1    Oct. 4, 2018

Related U.S. Application Data

(60) Provisional application No. 62/238,675, filed on Oct. 7, 2015.

(51) Int. Cl.
*H04L 1/18* (2006.01)
*H04L 5/00* (2006.01)
(Continued)

(52) U.S. Cl.
CPC .......... *H04L 1/1819* (2013.01); *H04L 1/1861* (2013.01); *H04L 5/0055* (2013.01); *H04W 56/001* (2013.01); *H04W 72/042* (2013.01)

(58) Field of Classification Search
None
See application file for complete search history.

(56) References Cited

U.S. PATENT DOCUMENTS

| 6,996,624 B1 * | 2/2006 | LeCroy | H04L 29/06027 370/231 |
| 9,986,556 B1 * | 5/2018 | Zhou | H04B 7/2656 |

(Continued)

FOREIGN PATENT DOCUMENTS

| KR | 10-1505925 | 3/2015 |
| WO | 2013015613 | 1/2013 |

OTHER PUBLICATIONS

PCT International Application No. PCT/KR2015/013772, International Search Report dated Jul. 21, 2016, 2 pages.

(Continued)

*Primary Examiner* — Ayaz R Sheikh
*Assistant Examiner* — Tarell A Hampton
(74) *Attorney, Agent, or Firm* — Lee Hong Degerman Kang & Waimey

(57) ABSTRACT

Provided are a method and an apparatus for transmitting retransmission data using an HARQ in a wireless communication system. Specifically, it is determined whether there is a radio resource for transmitting retransmission data. When the radio resource exists, a DCI format including a retransmission indicator field is configured. The retransmission indicator field indicates whether the retransmission data is general retransmission data or opportune retransmission data. The opportune retransmission data is retransmitted before an ACK/NACK signal for initial transmission data is received. The retransmission data is transmitted through the radio resource according to scheduling of a configured DCI format.

11 Claims, 18 Drawing Sheets

(51) Int. Cl.
*H04W 56/00* (2009.01)
*H04W 72/04* (2009.01)

(56) References Cited

U.S. PATENT DOCUMENTS

| | | | |
|---|---|---|---|
| 2004/0208160 A1* | 10/2004 | Petrovic | H04L 1/1835 370/350 |
| 2005/0171984 A1* | 8/2005 | Wang | H04W 72/0486 708/100 |
| 2006/0003787 A1* | 1/2006 | Heo | H04W 52/146 455/522 |
| 2009/0285163 A1* | 11/2009 | Zhang | H04W 72/042 370/329 |
| 2010/0115358 A1* | 5/2010 | Kotecha | H04L 1/1812 714/748 |
| 2010/0257419 A1 | 10/2010 | Sung et al. | |
| 2011/0134774 A1* | 6/2011 | Pelletier | H04W 52/365 370/252 |
| 2011/0205996 A1 | 8/2011 | Kim et al. | |
| 2011/0317639 A1* | 12/2011 | Lee | H04L 1/0015 370/329 |
| 2012/0051332 A1* | 3/2012 | Hole | H04W 72/1257 370/336 |
| 2013/0042157 A1* | 2/2013 | Mohammadi | H04L 1/0026 714/704 |
| 2013/0051272 A1 | 2/2013 | Wiberg et al. | |
| 2013/0107731 A1* | 5/2013 | Hu | H04L 1/0035 370/252 |
| 2013/0266001 A1 | 10/2013 | Peisa et al. | |
| 2015/0049708 A1* | 2/2015 | Damnjanovic | H04L 1/1812 370/329 |
| 2015/0049709 A1* | 2/2015 | Damnjanovic | H04L 5/0055 370/329 |
| 2015/0098418 A1* | 4/2015 | Vajapeyam | H04W 4/70 370/329 |
| 2016/0095101 A1* | 3/2016 | Ye | H04L 1/1812 370/329 |
| 2016/0095114 A1* | 3/2016 | Kim | H04W 74/0816 370/329 |
| 2016/0099799 A1* | 4/2016 | Bashar | H04W 72/02 370/280 |
| 2016/0227425 A1* | 8/2016 | Kim | H04L 1/1812 |
| 2016/0227455 A1* | 8/2016 | Lei | H04W 36/08 |
| 2016/0278049 A1* | 9/2016 | Nory | H04L 1/1896 |
| 2016/0278074 A1* | 9/2016 | Yang | H04L 1/1812 |
| 2016/0316435 A1* | 10/2016 | Guo | H04W 52/146 |
| 2016/0323887 A1* | 11/2016 | Patel | H04W 52/365 |
| 2017/0126365 A1* | 5/2017 | Peng | H04L 1/1822 |
| 2017/0215172 A1* | 7/2017 | Yang | H04B 7/26 |
| 2017/0295576 A1* | 10/2017 | Fukuta | H04W 16/14 |
| 2017/0366308 A1* | 12/2017 | Choi | H04L 1/1887 |
| 2018/0102880 A1* | 4/2018 | Xu | H04L 1/18 |
| 2018/0175973 A1* | 6/2018 | Rosa | H04L 1/1858 |

OTHER PUBLICATIONS

European patent application No. 15905903.9, European search report dated May 8, 2019, 13 pages.

Intel Corporation, "Protocol impact of TTI reduction," 3GPP TSG-RAN WG2 Meeting #91bis, R2-154296, Malmo, Sweden, Oct. 5-9, 2015, 5 pages.

* cited by examiner

FIG. 13

| DL/UL | RESOURCE ALLOCATION INFORMATION | NDI | ORI | RV | PCID | MCS | UL PC |

FIG. 14

| DL/UL | RESOURCE ALLOCATION INFORMATION | NDI | ORI | RV | PCID | DL PC | MCS | UL PC |

FIG. 15

| DL/UL | RESOURCE ALLOCATION INFORMATION | NDI | ORI | RV | PCID | MCS | DL PC |
|---|---|---|---|---|---|---|---|

FIG. 16

| DL/UL | RESOURCE ALLOCATION INFORMATION | NDI | ORI | RV | PCID | UL PC | MCS | DL PC |

…

METHOD AND APPARATUS FOR TRANSMITTING RETRANSMISSION DATA USING HARQ IN WIRELESS COMMUNICATION SYSTEM

CROSS-REFERENCE TO RELATED APPLICATIONS

This application is the National Stage filing under 35 U.S.C. 371 of International Application No. PCT/KR2015/013772, filed on Dec. 15, 2015, which claims the benefit of U.S. Provisional Application No. 62/238,675, filed on Oct. 7, 2015, the contents of which are all hereby incorporated by reference herein in their entirety.

BACKGROUND OF THE INVENTION

Field of the Invention

The present invention relates to wireless communication, and more particularly, to a method for transmitting retransmission data using HARQ in a wireless communication system and an apparatus using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present invention provides a method for transmitting retransmission data using HARQ in wireless communication system and an apparatus using the same.

In an aspect, a method for transmitting retransmission data using hybrid automatic repeat request (HARQ) by a base station in a wireless communication system is provided.

First, when terms are defined, a retransmission indicator field may be regarded as corresponding to an ORI field included in the DCI format. Therefore, the retransmission indicator field may indicate whether the retransmission data is the general retransmission data or the opportunistic retransmission data. The general retransmission data is retransmission data to be retransmitted after receiving the ACK/NACK signal for the initial transmission data and the opportunistic retransmission data is retransmission data to be retransmitted before receiving the ACK/NACK signal for the initial transmission data.

First, it is determined whether there is the radio resource for transmitting the retransmission data. Herein, the radio resource corresponds to the redundant radio resource and the radio resource is determined in the radio resource excluding the resource for transmitting the initial transmission data and the resource for transmitting the general retransmission data. Further, the radio resource may be determined through the inter-cell cooperation among the base stations. That is, the index information of the radio resource whose maximum power value of the retransmission data is limited and the information on the maximum power value of the retransmission data may be received from a neighbor base station adjacent to a serving base station.

The DCI format including the retransmission indicator field is configured when there is the radio resource for transmitting the retransmission data. That is, the retransmission indicator field may be included in the DCI format to indicate the opportunistic retransmission data to be retransmitted before receiving the ACK/NACK signal. In addition, the DCI format may further include a process ID (PCID) field and a modulation coding scheme (MCS) field. Herein, the PCID field indicates the number of HARQ processes of the retransmission data. The number of HARQ processes of the retransmission data is determined according to the number of HARQ processes until the ACK/NACK signal for the initial transmission data is received after the initial transmission data is transmitted. The reason is that the HARQ process of the opportune retransmission data is performed until the ACK/NACK signal for the initial transmission data is received after the initial transmission data is transmitted.

When the retransmission indicator field indicates that the retransmission data is the opportune retransmission data, the power information for the retransmission data may be transmitted using the redundant bits in the PCID field and the MCS field. The reason is that when the retransmission data is the opportune retransmission data, fewer PCID bits are required than the general retransmission and because of the constraint of the encoding time, only fewer MCS bits are required.

Further, according to the power information for the retransmission data, the retransmission data is transmitted using the remaining power other than the power used for the initial transmission data and the power used for the general retransmission data. In addition, the retransmission data may be transmitted using the channel code and the modulation scheme used for the initial transmission data. Further, the channel code is used as it is, but the modulation scheme may be changed and used.

However, the DCI format configured when the retransmission indicator field indicates that the retransmission data is the opportunistic retransmission data has the same-length bit as the DCI format configured when the retransmission indicator field indicates that the retransmission data is the general retransmission data. The reason is that in the case of the opportunistic retransmission data, the power information for the opportunistic retransmission data is additionally included in the DCI format, but a total length of the DCI format is the same because the power information for the opportunistic retransmission data adopts the redundant bits in the PCID field and the MCS field.

The HARQ processes of the initial transmission data and the retransmission data may be performed by unit of a shorter sTTI than the TTI corresponding to the subframe. Further, the HARQ processes may be performed only by unit of the existing TTI or only by unit of the sTTI. In addition, the HARQ process may be performed by applying both the TTI structure and the sTTI structure. When the TTI structure and the sTTI structure are applied together, a probability that the redundant radio resource will be generated in the LTE system may increase.

When the sTTI corresponds to two symbols, a symbol interval of the ACK/NACK signal for the downlink data and the symbol interval of the ACK/NACK signal for the uplink data may have different lengths.

The retransmission data is transmitted through the radio resource according to the scheduling of the DCI format configured in advance.

In another aspect, an apparatus for transmitting retransmission data using hybrid automatic repeat request (HARQ) in a wireless communication system is provided.

The wireless apparatus includes: an RF unit transmitting and receiving a radio signal; and a processor including the RF unit. The processor determines whether there is the radio resource for transmitting the retransmission data. Herein, the radio resource corresponds to the redundant radio resource and the radio resource is determined in the radio resource excluding the resource for transmitting the initial transmission data and the resource for transmitting the general retransmission data. Further, the DCI format including the retransmission indicator field is configured when there is the radio resource for transmitting the retransmission data. Further, the DCI format may include the retransmission indicator field to indicate opportunistic retransmission data which is retransmitted before receiving the ACK/NACK signal. Last, the retransmission data is transmitted through the radio resource according to the scheduling of the DCI format configured in advance.

By using the proposed technique, it is possible to simultaneously transmit a downlink control signal and an uplink control signal in a limited low-latency resource. By using the proposed technique, transmission using sTTI in a minimum of 4 RBs is enabled, and as a result, low-latency transmission is enabled even in an LTE system having a system band of 1.4 MHz. That is, reliability of performing retransmission using HARQ can be improved.

BRIEF DESCRIPTION OF THE DRAWINGS

FIG. 13 illustrates an example of a configuration of a DCI format for downlink retransmission depending on an ORI value.

FIG. 14 illustrates an example of the configuration of the DCI format for downlink retransmission depending on the ORI value.

FIG. 15 illustrates an example of the configuration of the DCI format for uplink retransmission depending on the ORI value.

FIG. 16 illustrates an example of the configuration of the DCI format for the uplink retransmission depending on the ORI value.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
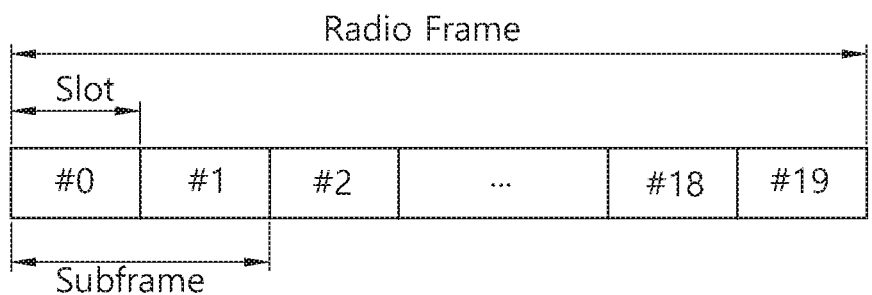
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
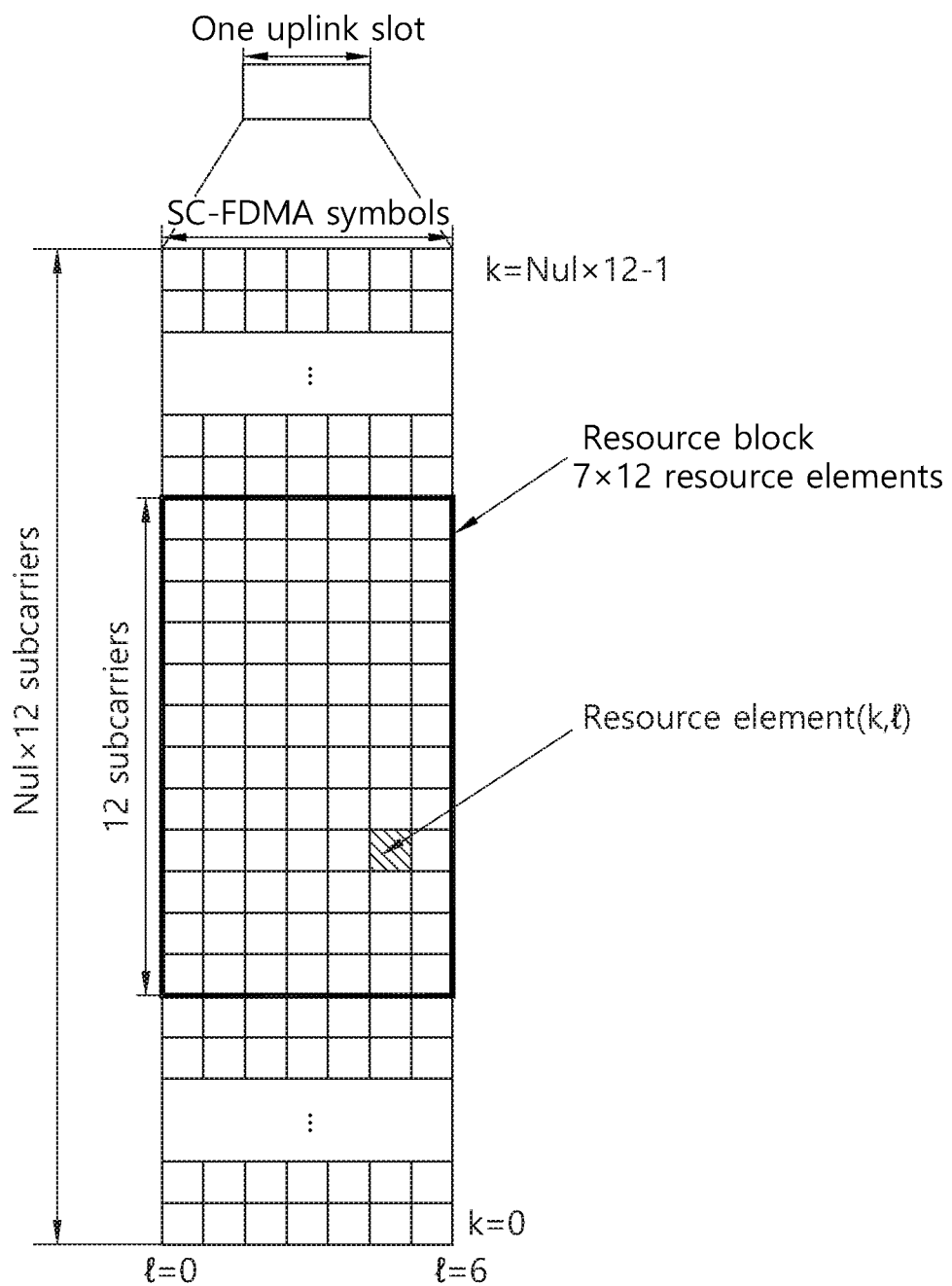
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k (k=0, . . . , $N^{UL}$×12−1) denotes a subcarrier index in the frequency domain, and l (l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
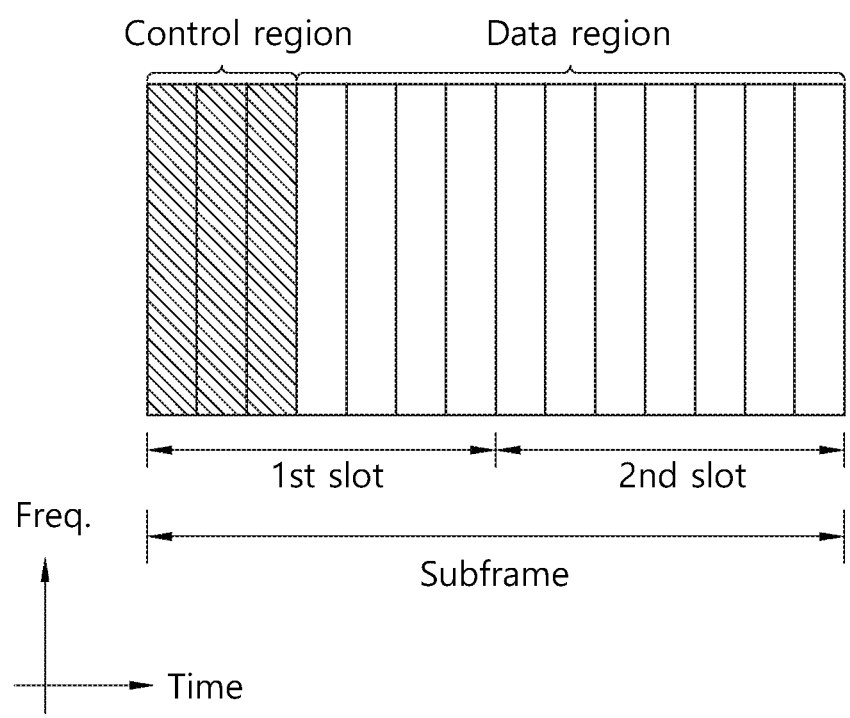
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
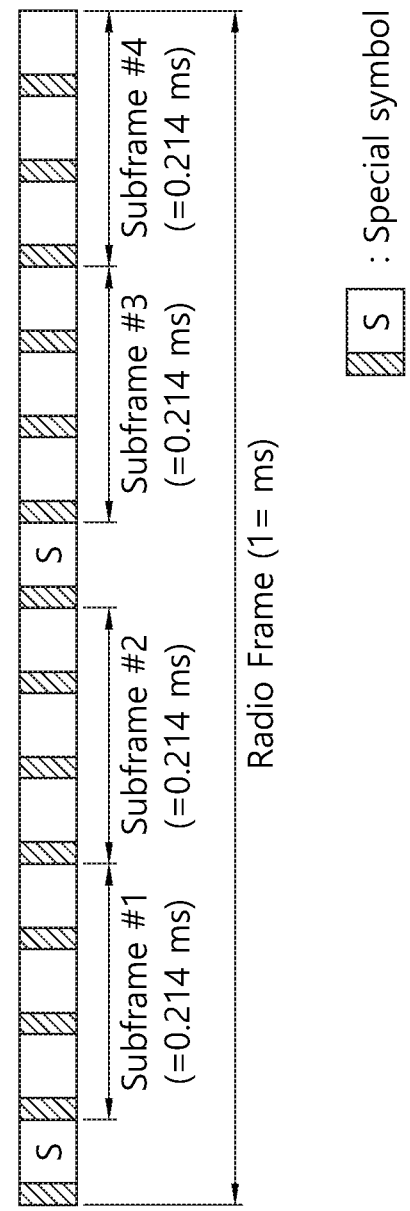
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
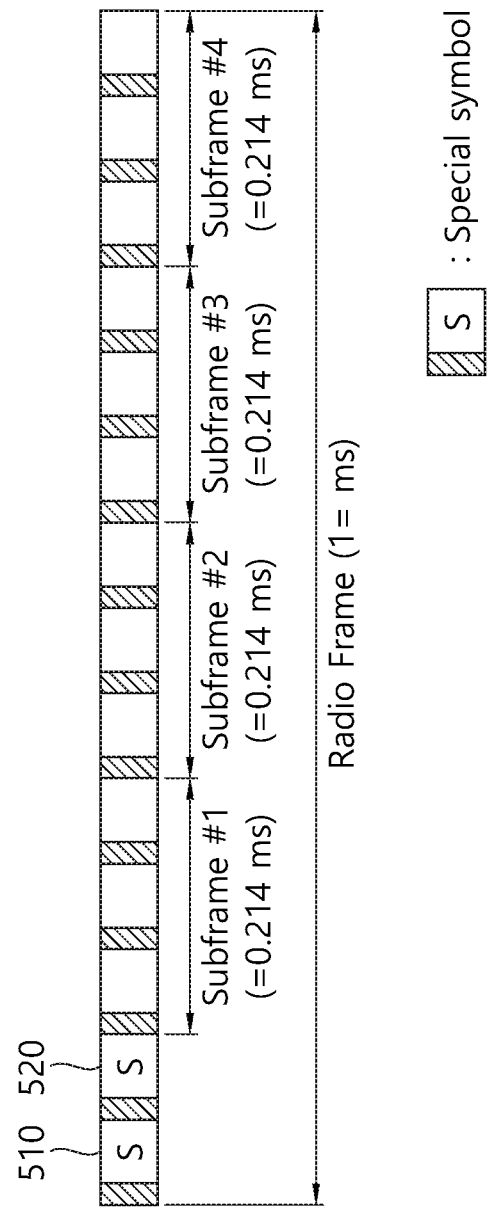
FIG. 5 shows an example of the structure of a radio frame in which special symbols have been contiguously disposed at the front part of the radio frame.
Figure 6:
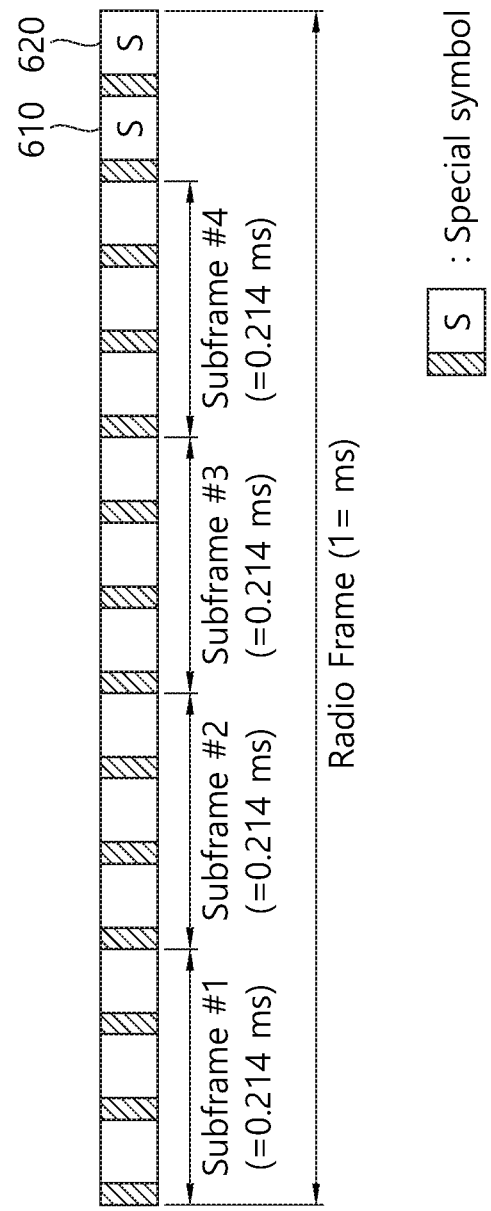
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

Meanwhile, there are a forward error correction (FEC) scheme and an automatic repeat request (ARQ) scheme as an error compensation technique for ensuring the reliability of wireless communication. In the FEC scheme, a redundant error correction code is added to information bits to correct an error at a receiving end. The FEC scheme is advantageous in that there is no time delay and no information is exchanged between a transmitting end and the receiving end. However, there is a disadvantage in that system efficiency drops in a good channel environment. The ARQ scheme may increase transmission reliability, but has a disadvantage in that the time delay occurs and system efficiency drops in a poor channel environment.

The hybrid automatic repeat request (HARQ) scheme in which the FEC and the ARQ are combined checks whether data received by a physical layer includes an error which may not be decoded and requests retransmission when the error occurs, thereby improving performance.

In the HARQ, a receiver transmits an acknowledgement (ACK) signal as reception acknowledgement when no error is detected in the received data to notify a transmitter of successful reception. When the error is detected in the received data, the receiver transmits a not-acknowledgment (NACK) signal as the reception acknowledgment to inform the transmitter of the error detection. The transmitter may retransmit the data when the NACK signal is received.

In the LTE system, eight HARQ processes are used as a method for recovering the error of the data and there are two types of the asynchronous HARQ process and the synchronous HARQ process according to the timing of the data retransmission.

Figure 7:
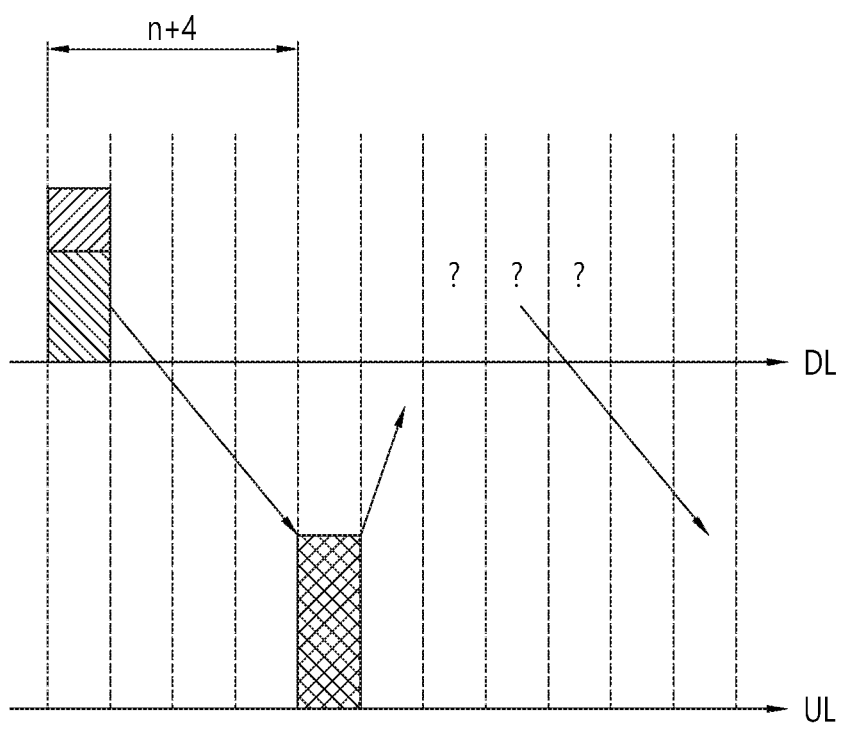
FIG. 7 illustrates an example of an asynchronous HARQ process.

FIG. 7 illustrates an example of an asynchronous HARQ process.

Referring to FIG. 7, a base station receiving the NACK in the downlink transmits the retransmission data by setting an NDI in a DL grant (DCI format 1) as a bit indicating that the transmitted data is the retransmission data. In this case, it is together indicated for which data the corresponding data is the retransmission data including an HARQ process ID. Since the HARQ process is asynchronous, the timing of retransmitting the data is not fixed but may vary.

Figure 8:
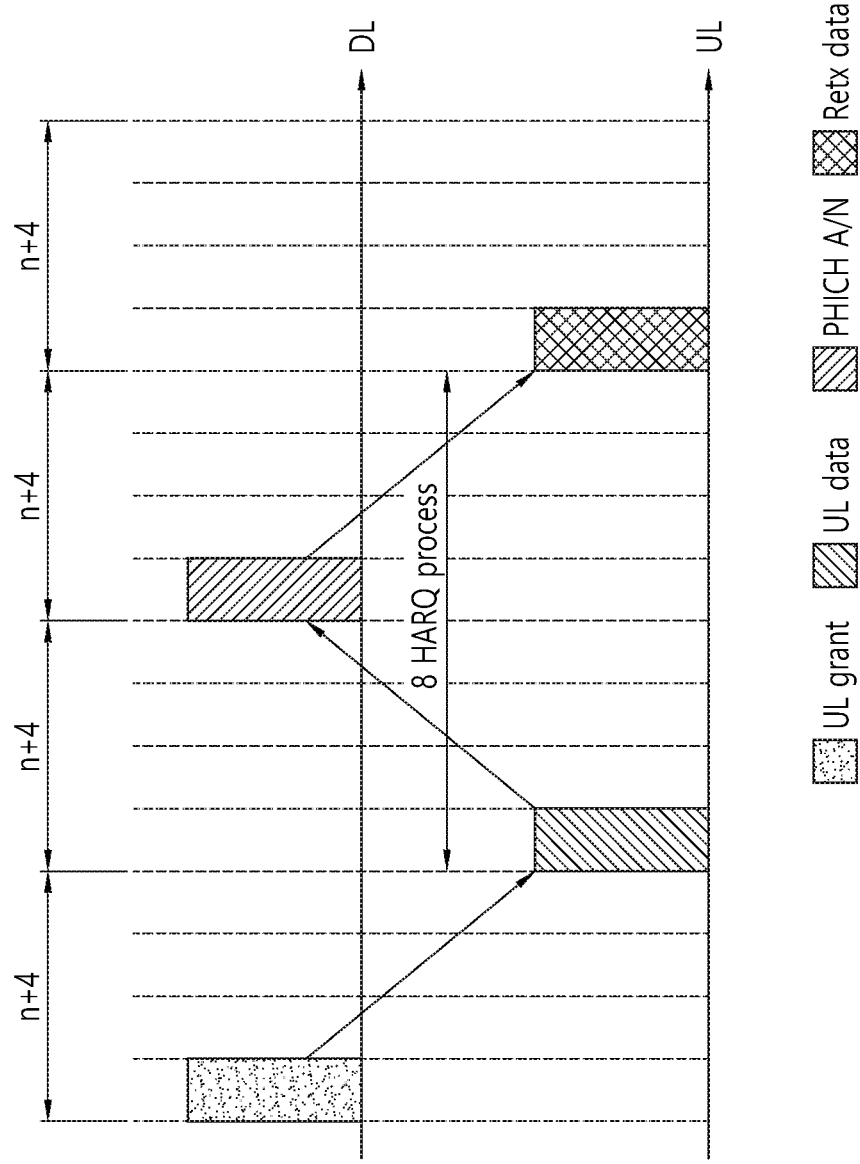
FIG. 8 illustrates an example of a synchronous HARQ process.

FIG. 8 illustrates an example of a synchronous HARQ process.

Referring to FIG. 8, the base station receiving the NACK in the uplink transmits the retransmission data may allocate a resource for the retransmission data to a new resource by setting an NDI in a UL grant (DCI format 1) as a bit indicating that the transmitted data is the retransmission data. Alternatively, the UL grant is omitted to transmit the retransmission data to the same resource as initial transmission data. In this case, a timing of retransmitting the data is continuously fixed to a subframe within 4 ms after receiving the NACK.

The HARQ technique basically attempts error correction on a received code and determines whether to retransmit the data using a simple error detection code such as a cyclic redundancy check (CRC). The HARQ scheme for the retransmission is generally divided into three types as follows. In the LTE system, the HARQ technique is performed through chase combining (CC) or incremental redundancy (IR).

HARQ technique type 1: The receiving end discards a packet having the error and requests retransmission and the transmitting end transmits the same packet as in initial transmission. This improves the reliability of the system and improves the performance through the FEC scheme by packetizing the packet with the error.

HARQ technique type 2 (chase combining): The HARQ technique type 2 is a technique used to not packetizing the packet with the error but combining the packet with the retransmitted packet. Combining multiple packets may result in the same effect as increasing signal power.

HARQ technique type 3 (incremental redundancy): In case of Type 1, it is necessary to prevent unnecessarily high redundancy codes from being transmitted during the initial transmission. HARQ technique type 3 is a technique that uses a code with a high code rate in the initial transmission and transmits additional redundancy when the retransmission is performed.

In the current LTE system, the transmitting end performs the retransmission after receiving the ACK/NACK signal from the receiving end. Since a time required for unidirectional communication in the LTE system is 4 ms, it takes a minimum of 8 ms to perform the retransmission. In communication systems where a main performance metric is a transmission rate, such as a mobile broadband service, the time required for the retransmission is not a major issue. However, the time is an important issue in a mission critical service requiring low latency and high reliability. As an example, high reliability and low-latency machine type communications (MTC) among major services of a next-generation wireless communication system needs to achieve very high reliability while achieving wireless transmission latency of 1 ms.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

That is, the sTTI needs to be applied in order to realize the wireless transmission latency of 1 ms. The sTTI structure for recycling OFDM symbols of the LTE system may have the frame structure including the special symbol in the subframe as described above. When the data is not transmitted in the special symbol, the stand-by time of the data increases. Therefore, in the present specification, the HARQ process is proposed so that the latency of the user plane becomes 1 ms or less in consideration of the latency due to the special symbols. In addition, an opportunistic retransmission technique is proposed to transmit important and urgent information as quickly and accurately as possible. The opportunistic retransmission technique is advantageous in that the retransmission data is transmitted faster than a technique that retransmit the data after receiving a general ACK/NACK signal. However, there is a disadvantage that retransmission may not be performed when there is no redundant resource.

Hereinafter, the HARQ process to which the sTTI structure is applied will be described.

The sTTI structure for achieving the latency of the user plane of 1 ms using the OFDM symbol of the LTE system may be generally divided into an sTTI structure having three symbols and an sTTI structure having two symbols. Herein, proposed is the HARQ process to which the sTTI structure having three symbols and the sTTI structure having two symbols are applied.

Figure 9:
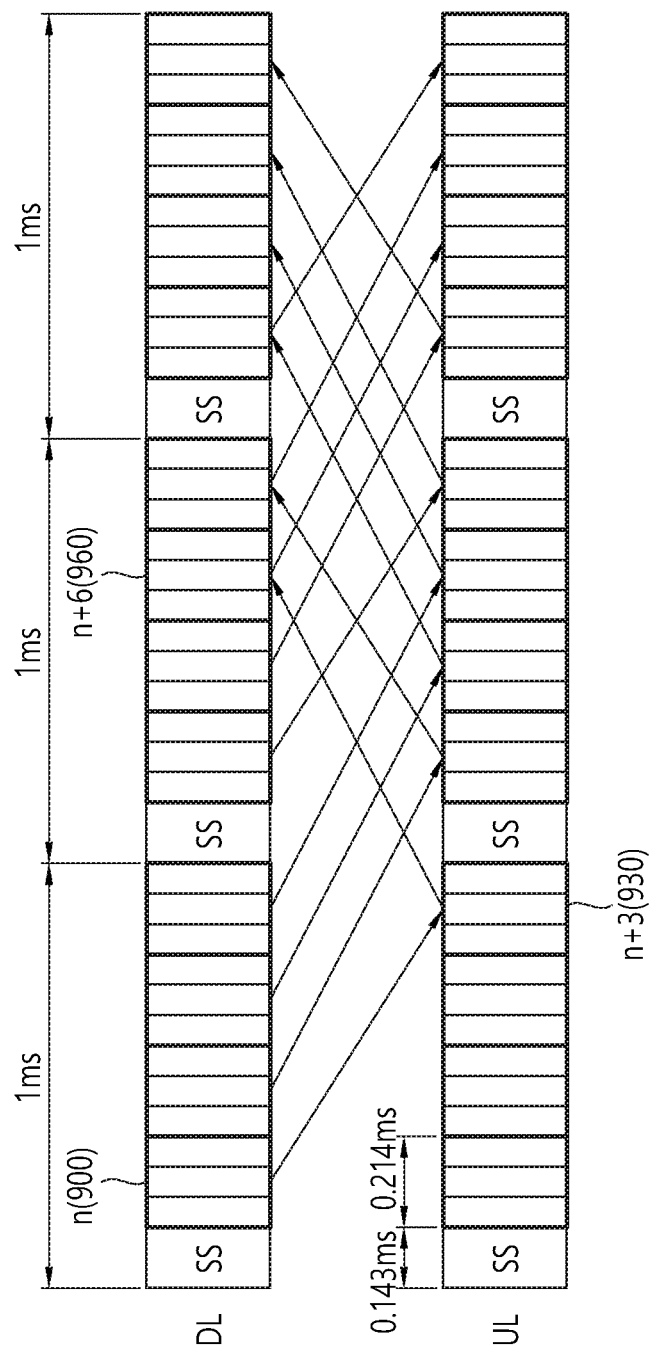
FIG. 9 illustrates an example of an HARQ process of an sTTI structure having three symbols in which special symbols are consecutively disposed.
Figure 10:
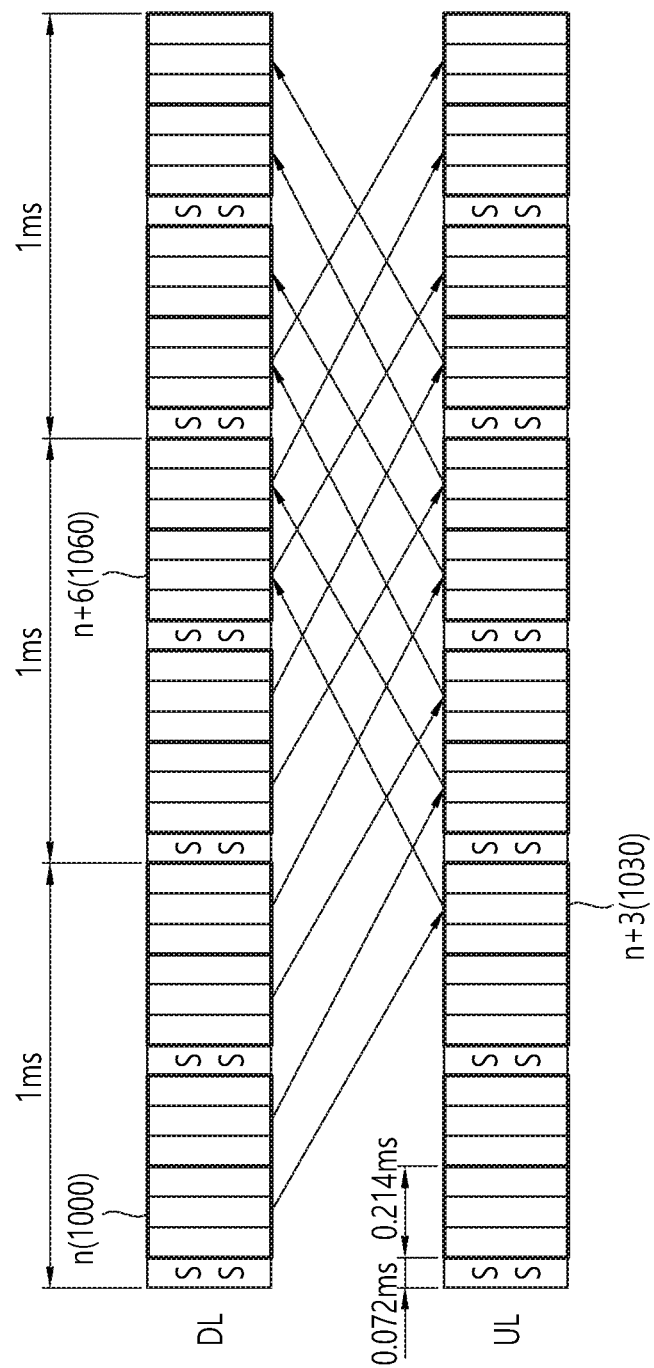
FIG. 10 illustrates an example of an HARQ process of an sTTI structure having three symbols in which special symbols are dispersively disposed.

FIG. 9 illustrates an example of an HARQ process of an sTTI structure having three symbols in which special symbols are consecutively arranged. FIG. 10 illustrates an example of an HARQ process of an sTTI structure having three symbols in which special symbols are dispersively disposed.

FIGS. 9 and 10 are different from each other in that in FIG. 9, special symbols (ss) are disposed as two consecutive symbols and in FIG. 10, the special symbols (ss) are dispersively disposed as one symbol. An ACK/NACK feedback procedure of the HARQ process of the sTTI structure having three symbols to satisfy the latency of the user plane of 1 ms is as follows.

First, the maximum number of HARQ processes is six. Referring to FIGS. 9 and 10, ACK/NACK feedback information for a short PDSCH (sPDSCH) defined as a short PDCCH (sPDCCH) in an sTTI 900 or 1000) with a time index of n is transmitted in sTTI 930 or 1030 with a time index of n+3. In addition, the sPUSCH defined as the sPDCCH in the sTTI 900 or 1000 with the time index of n is transmitted in the sTTIs 930 or 1030 with the index of n+3. When there is a resource area of a short PHICH (sPHICH) in the downlink, the ACK/NACK feedback information for the sPUSCH is transmitted in the sTTI 960 or 1060 with a time index of n+6. The presence of a special symbol (ss) located between the sTTIs does not change the time index of the sTTI.

Figure 11:
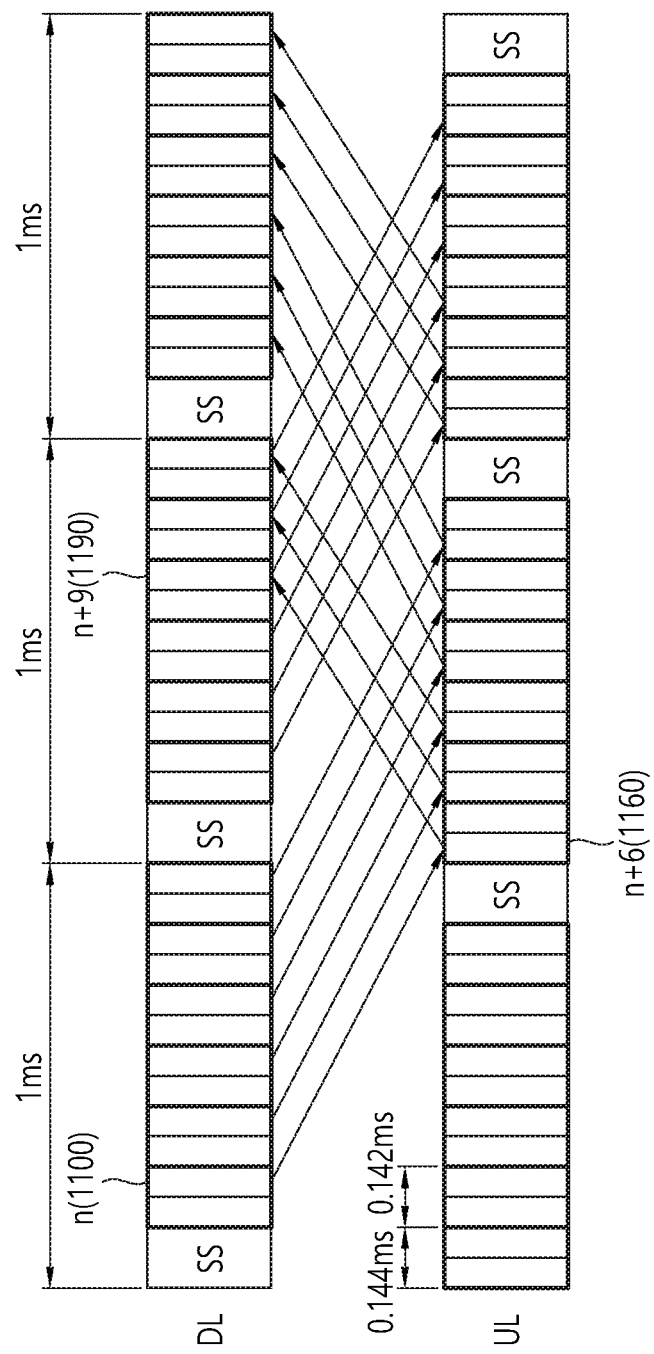
FIG. 11 illustrates an example of an HARQ process of an sTTI structure having two symbols when there are special symbols.
Figure 12:
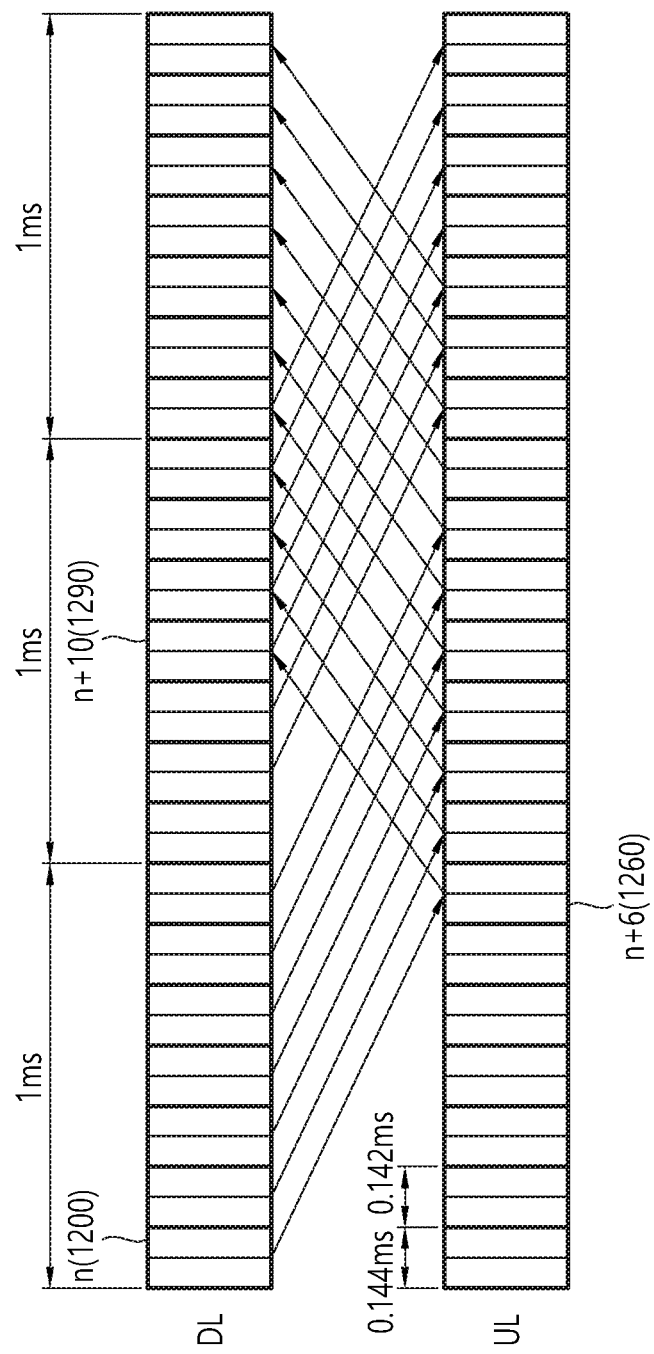
FIG. 12 illustrates an example of an HARQ process of an sTTI structure having two symbols when there is no special symbol.

FIG. 11 illustrates an example of an HARQ process of an sTTI structure having two symbols when there are special symbols. FIG. 12 illustrates an example of an HARQ process of an sTTI structure having two symbols when there is no special symbol.

In order to satisfy the latency of the user plane of 1 ms, in the sTTI structure having two symbols, a symbol interval of the ACK/NACK feedback for the downlink signal and a symbol interval of the ACK/NACK feedback for the uplink signal have different lengths. This is to ensure a sufficient data decoding time that requires a relatively long process time in preparation for encoding in the frame structure in which the special symbol (ss) exists. In addition, both symbol intervals have different lengths in order to satisfy the latency of the user plane of 1 ms.

The ACK/NACK feedback procedure of the HARQ process of the sTTI structure having two symbols is as follows. First, the maximum number of HARQ processes is six.

Referring to FIG. 11, the ACK/NACK feedback information for the sPDSCH defined as the sPDCCH in the sTTI 1100 with the time index of n is transmitted in the sTTI 1160 with the time index of n+6. In addition, the sPUSCH defined as the sPDCCH in the sTTI 1100 with the time index of n is transmitted in the sTTIs 1160 with the index of n+6. When there is the resource area of the sPHICH in the downlink, the ACK/NACK feedback information for the sPUSCH is transmitted in an sTTI 1190 with a time index of n+9. As illustrated in FIG. 11, when the special symbol ss is not utilized as the sTTI, the presence of the special symbol ss located between the sTTIs does not change the time index of the sTTI.

Referring to FIG. 12, the ACK/NACK feedback information for the sPDSCH defined as the sPDCCH in the sTTI 1200 with the time index of n is transmitted in the sTTI 1260 with the time index of n+6. In addition, the sPUSCH defined as the sPDCCH in the sTTI 1200 with the time index of n is transmitted in the sTTIs 1260 with the index of n+6. When there is the resource area of the sPHICH in the downlink, the ACK/NACK feedback information for the sPUSCH is transmitted in an sTTI 1290 with a time index of n+10. As illustrated in FIG. 12, when the special symbol ss is utilized as the sTTI, the presence of the special symbol ss located between the sTTIs may increase the time index of the sTTI.

Hereinafter, the opportunistic retransmission technique will be described. The opportunistic retransmission technique is a technique for performing retransmission before the transmitting end receives the ACK/NACK signal or regardless of receiving the ACK/NACK signal using a redundant radio resource when the redundant radio resource exists. The HARQ process to which the opportunistic retransmission technique is applied may be performed only by unit of the existing TTI or only by unit of the sTTI. In addition, the HARQ process may be performed by applying both the TTI structure and the sTTI structure. When the TTI structure and the sTTI structure are applied together, a probability that the redundant radio resource will be generated in the LTE system may increase. The sTTI structure may be represented by the sTTI which has less symbols than the TTI. In addition, the sTTI structure may be represented by the sTTI in which each symbol length itself is reduced.

The existing HARQ process technique determines whether to retransmit the data according to a success or failure of decoding in the receiving end. That is, the retransmission is performed after receiving the ACK/NACK signal for the initial transmission data. In this case, the retransmission data may be called general retransmission data.

Unlike this, the opportunistic retransmission technique is a technique for determining retransmission according to the presence of the redundant radio resource. Herein, the redundant radio resource corresponds to a remaining resource excluding resources used for transmitting the initial transmission data and the ACK/NACK signal for the initial transmission data. That is, a scheduling priority of the data transmitted through the opportunistic retransmission technique needs to be set lower than the initial transmission data and the retransmission data after receiving the ACK/NACK signal for the initial transmission data. As described above, in the opportunistic retransmission technique, the retransmission is performed before receiving the ACK/NACK signal or regardless of receiving the ACK/NACK signal. Due to the above feature, the opportunistic retransmission technique may be designed to satisfy the following conditions.

Transmission resource: Opportunistic retransmission is performed in the redundant radio resource other than resources for transmitting the initial transmission data and the retransmission data after receiving the ACK/NACK signal.

Transmission power: The opportunistic retransmission is performed using the remaining power except for power used for the initial transmission data and the retransmission data after receiving the ACK/NACK signal from total transmission power.

Modulation scheme: Scheduling is performed for opportunistic retransmission data after scheduling the initial transmission data and the retransmission data after receiving the ACK/NACK signal. Therefore, it is desirable to minimize scheduling latency due to the opportunistic retransmission. As an example, the opportunistic retransmission data may be transmitted using a channel code and a modulation scheme used when transmitting the initial transmission data. As another example, the opportunistic retransmission data may be transmitted using the channel code used when transmitting the initial transmission data as it is, but changing only the modulation scheme.

Interference control: Since the signal transmitted through the opportunistic retransmission is a low-priority signal, it is necessary to minimize interference with neighbor cells due to the opportunistic retransmission. To this end, a method for limiting maximum available power when performing the opportunistic retransmission may be applied. In addition, it is possible to reduce the occurrence of the interference due to the opportunistic retransmission by presetting a frequency band in which the opportunistic retransmission may be performed.

Energy consumption reduction technique: When the receiver successfully decodes when transmitting the initial transmission data, if the signal is transmitted again by the opportunistic retransmission, energy is wasted. Therefore, it is necessary to determine the transmission power at the time of the opportunistic retransmission in consideration of a channel state, the modulation scheme, the transmission power, and residual energy of the terminal when transmitting the initial transmission data in order to minimize the waste of the energy. When it is determined that the opportunistic retransmission is not necessary through the calculation by the scheme, the transmission power of the opportunistic retransmission data becomes 0 and the opportunistic retransmission is not performed even if there is the redundant radio resource. The opportunistic retransmission scheme in the downlink/uplink will be described based on the conditions of the opportunistic retransmission technique described above.

Hereinafter, the downlink opportunistic retransmission technique will be described.

FIG. 13 illustrates an example of a configuration of a DCI format for downlink retransmission depending on an ORI value. FIG. 14 illustrates an example of the configuration of the DCI format for downlink retransmission depending on the ORI value.

In order to perform the downlink opportunistic retransmission technique, a simple DL grant for downlink opportunistic retransmission may be used. The DCI format illustrated in FIGS. 13 and 14 may be configured using the simple DL grant. The information included in the simple DL grant is as follows.

Opportunistic retransmission resource allocation information

Opportunistic retransmission process ID (PCID): After receiving the ACK/NACK for the initial transmission data, there is no need to perform the opportunistic retransmission. Therefore, the number of processes for the opportunistic retransmission is determined by an interval between the transmission of the initial transmission data and the reception of the ACK/NACK. When the ACK/NACK is received at the m+nth sTTI after receiving the initial transmission data at the mth sTTI, the maximum number of processes for the opportunistic retransmission is n and the number of bits for representing the process ID (PCID) is [$\log_2 n$].

(Optional) Symbol mapping method of opportunistic retransmission: When the opportunistic retransmission is performed, resources not used in the corresponding TTI are generated. Therefore, it is desirable to recycle an encoded signal before that as much as possible. To this end, a transmitting terminal needs to buffer the existing signal and information on the modulation scheme and the multi input multi output (MIMO) transmission technique may be removed or minimized.

Power setting of downlink opportunistic retransmission signal: In order to minimize the power consumption due to the opportunistic retransmission, information for dynamically changing the transmission power of the opportunistic retransmission is transmitted according to the probability of success of the transmitted signal. The information is information indicating a relative value of the previous transmission power for the same data. The maximum power of the opportunistic retransmission is the previous transmission power of the same data. Through the information, it is possible to determine how much the transmission power of the opportunistic retransmission is reduced as compared with the previous transmission. The reason why it is necessary to grasp a power change during the opportunistic retransmission is that a correct signal may be restored only by receiving a power difference between a cell-specific reference signal (CRS) and the opportunistic retransmission data when using the CRC. Conversely, when a demodulation-reference signal (DM-RS) is applied, the transmission power of the data and the reference signal is the same, and therefore, the above information is unnecessary in the opportunistic retransmission technique using the DM-RS. The terminal may grasp the power of the actually transmitted signal using an opportunistic retransmission power value through higher layer signaling together with the information. As an example, it is assumed that a power ratio $\rho_A$ of the opportunistic retransmission and the general data transmission is specified through the higher layer signaling and a power reduction ratio $\rho_B$ to the previous transmission is delivered through the simple DL grant. Where $0 \leq \rho_A \leq 1$ and $0 \leq \rho_B \leq 1$. When the previous transmission of the same data is the general data transmission that is transmitted with power P, the transmission power of the opportunistic retransmission received at this time is $P\rho_A\rho_B$. When the previous transmission of the same data is the opportunistic retransmission, the transmission power of the opportunistic retransmission received at this time becomes $P\rho_B$. When overhead of the simple DL grant is to be reduced, the value of $\rho_B$ may not be transmitted. However, in this case, there is disadvantageous in that the power consumption due to the opportunistic retransmission may not be optimized.

Power setting of uplink control signal: A value for setting the transmission power of a control signal resource for sending a response signal (ACK/NACK) to the received data is transmitted. The above value is set in consideration of the opportunistic retransmission and the general data transmission with the same importance.

The simple DL grant may be used for other purposes at the same time, including the opportunistic retransmission. In this case, the simple DL grant includes the following information.

DL/UL indicator: The DL/UL indicator may include an indicator whether the corresponding information is DL grant or UL grant. Herein, since the DL/UL indicator performs the downlink opportunistic retransmission technique, the DL/UL indicator may indicate the DL grant.

Resource allocation information

New data indicator (NDI): The new data indicator (NDI) is used to indicate whether data to be received or transmitted is the initial transmission data or the retransmission data.

Opportunistic retransmission indicator (ORI): The opportunistic retransmission indicator (ORI) is used to indicate whether the data to be received or transmitted is the general retransmission data or the opportunistic retransmission data. As an example, when NDI=0 and ORI=0, retransmission is performed with the general retransmission data and when NDI=0 and ORI=1, retransmission is performed with the opportunistic retransmission data. When NDI=1, the terminal recognizes an ORI value as a dummy value.

(Optional) redundancy version (RV) of retransmission signal: The (optional) redundancy version (RV) of retransmission signal indicates the RVs of the general retransmission signal and the opportunistic retransmission signal. RV values may not be used in the opportunistic retransmission.

Retransmission process ID (PCID): When ORI=0, the corresponding value indicates the PCID of the general retransmission data. When ORI=1, the corresponding value indicates the PCID of the opportunistic retransmission data. Generally, since the maximum number of processes in the opportunistic retransmission data is smaller than the number of processes in the general retransmission data, the number of bits for representing the PCID is defined as the number of processes in the general retransmission data. Bits not used in the opportunistic retransmission may be recognized as the dummy value of the terminal or used for power setting of the downlink opportunistic retransmission signal.

Modulation scheme: In case of initial transmission data or general retransmission data, a modulation coding scheme (MCS) level is selected according to the existing scheme. Even in the case of the opportunistic retransmission, the data is transmitted in the same scheme, but it is generally desirable to set the same MCS as the previous transmission in order to minimize the encoding time of the opportunistic retransmission data. Alternatively, the MCS may be configured by using the same channel code as the previous transmission, but by changing the modulation scheme.

Power setting of downlink opportunistic retransmission signal (DL PC): The same information as the above example is transmitted. That is, it is assumed that the power ratio $\rho_A$ of the opportunistic retransmission and the general data transmission is specified through the higher layer signaling and the power reduction ratio $\rho_B$ to the previous transmission is delivered through the simple DL grant. Where $0 \leq \rho_A \leq 1$ and $0 \leq \rho_B \leq 1$. When the previous transmission of the same data is the general data transmission that is transmitted with power P, the transmission power of the opportunistic retransmission received at this time is $P\rho_A\rho_B$. When the previous transmission of the same data is the opportunistic retransmission, the transmission power of the opportunistic retransmission received at this time becomes $P\rho_B$. However, in order to match the length of the DCI format (control information) with the case of the non-opportunistic retransmission, the information may be transmitted using the bits not used in the opportunistic retransmission. For example, in the case of the opportunistic retransmission, fewer PCIDs are required than the general retransmission and further, because of a constraint of the encoding time, only a few bits are required for a smaller number of modulation schemes. Therefore, power setting information of the opportunistic retransmission may be transmitted using the redundant bits in the PCID and the MCS. In addition, the power information of the opportunistic retransmission may be transmitted by using only the redundant bits in the PCID or only the redundant bits in the MCS. FIG. 13 illustrates configuration information of the DCI format when the ORI of the simple DL grant is 0 and FIG. 14 illustrates the configuration information of the DCI format when the ORI of the simple DL grant is 1. The lengths of the DCI formats in FIGS. 13 and 14 are the same as each other. In FIG. 14, the configuration information may include the power setting information (DL PC) of the opportunistic retransmission by utilizing the redundant bits in the PCID and the MCS.

Power setting of uplink control signal: The value for setting the transmission power of the control signal resource for sending the response signal (ACK/NACK) to the received data is transmitted. The above value is set in consideration of the opportunistic retransmission and the general data transmission with the same importance. Both FIGS. 13 and 14 contain the same power setting information (UL PC) of the uplink control signal regardless of the general retransmission data or the opportunistic retransmission data.

The interval for transmitting the ACK/NACK signal after receiving the downlink opportunistic retransmission signal is the same as the transmission interval of the ACK/NACK signal for the general signal transmission. The transmission resource of the ACK/NACK signal for the downlink opportunistic retransmission is mapped to one of the uplink control signals corresponding to the resource that transmits the simple DL grant.

The resource for performing the downlink opportunistic retransmission is configured through inter-cell coordination. The exchange of information between the base stations is performed through the X2 interface and when the downlink opportunistic retransmission is performed, the index information of the resource whose maximum power is limited and the corresponding maximum power value are transmitted. The base station that receives the index information and the maximum power value determines a signal to be scheduled in the corresponding frequency band according to the importance of the signal. The types of information through the X2 interface according to the network environment are as follows.

When fractional frequency reuse (FFR) is not basically used in providing low-latency high-reliability service: The FFR is applied only to the opportunistic retransmission in order to minimize the occurrence of additional interference due to the opportunistic retransmission. To this end, the index information of the resource whose maximum power is limited and the maximum transmission power of the corresponding frequency band are transmitted to the base station of the neighboring cell through the X2 interface during the downlink opportunistic retransmission.

When FFR is basically used in providing low-latency high-reliability service: There is no information exchange through an additional X2 interface for the opportunistic retransmission, applying the FFR similarly to other transmission techniques.

A specific embodiment of FIGS. 13 and 14 is as follows.

First, when terms are defined, a retransmission indicator field may be regarded as corresponding to an ORI field included in the DCI format. Therefore, the retransmission indicator field may indicate whether the retransmission data is the general retransmission data or the opportunistic retransmission data. The general retransmission data is retransmission data to be retransmitted after receiving the ACK/NACK signal for the initial transmission data and the opportunistic retransmission data is retransmission data to be retransmitted before receiving the ACK/NACK signal for the initial transmission data.

First, it is determined whether there is the radio resource for transmitting the retransmission data. Herein, the radio resource corresponds to the redundant radio resource and the radio resource is determined in the radio resource excluding the resource for transmitting the initial transmission data and the resource for transmitting the general retransmission data. Further, the radio resource may be determined through the inter-cell coordination among the base stations. That is, the index information of the radio resource whose maximum power value of the retransmission data is limited and the information on the maximum power value of the retransmission data may be received from a neighbor base station adjacent to a serving base station.

The DCI format including the retransmission indicator field is configured when there is the radio resource for transmitting the retransmission data. That is, the retransmission indicator field may be included in the DCI format to indicate the opportunistic retransmission data to be retransmitted before receiving the ACK/NACK signal. In addition, the DCI format may further include a process ID (PCID) field and a modulation coding scheme (MCS) field. Herein, the PCID field indicates the number of HARQ processes of the retransmission data. The number of HARQ processes of the retransmission data is determined according to the number of HARQ processes until the ACK/NACK signal for the initial transmission data is received after the initial transmission data is transmitted. The reason is that the HARQ process of the opportunistic retransmission data is performed until the ACK/NACK signal for the initial transmission data is received after the initial transmission data is transmitted.

When the retransmission indicator field indicates that the retransmission data is the opportunistic retransmission data, the power information for the retransmission data may be transmitted using the redundant bits in the PCID field and the MCS field. The reason is that when the retransmission data is the opportunistic retransmission data, fewer PCID bits are required than the general retransmission and because of the constraint of the encoding time, only fewer MCS bits are required.

Further, according to the power information for the retransmission data, the retransmission data is transmitted using the remaining power other than the power used for the initial transmission data and the power used for the general retransmission data. In addition, the retransmission data may be transmitted using the channel code and the modulation scheme used for the initial transmission data. Further, the channel code is used as it is, but the modulation scheme may be changed and used.

However, the DCI format configured when the retransmission indicator field indicates that the retransmission data is the opportunistic retransmission data has the same-length bit as the DCI format configured when the retransmission indicator field indicates that the retransmission data is the general retransmission data. The reason is that in the case of the opportunistic retransmission data, the power information for the opportunistic retransmission data is additionally included in the DCI format, but a total length of the DCI format is the same because the power information for the opportunistic retransmission data adopts the redundant bits in the PCID field and the MCS field.

The HARQ processes of the initial transmission data and the retransmission data may be performed by unit of a shorter sTTI than the TTI corresponding to the subframe. Further, the HARQ processes may be performed only by unit of the existing TTI or only by unit of the sTTI. In addition, the HARQ process may be performed by applying both the TTI structure and the sTTI structure. When the TTI structure and the sTTI structure are applied together, a probability that the redundant radio resource will be generated in the LTE system may increase.

When the sTTI corresponds to two symbols, a symbol interval of the ACK/NACK signal for the downlink data and the symbol interval of the ACK/NACK signal for the uplink data may have different lengths.

The retransmission data is transmitted through the radio resource according to the scheduling of the DCI format configured in advance.

Hereinafter, the uplink opportunistic retransmission technique will be described.

FIG. 15 illustrates an example of the configuration of the DCI format for uplink retransmission depending on the ORI value. FIG. 16 illustrates an example of the configuration of the DCI format for the uplink retransmission depending on the ORI value.

In order to perform the uplink opportunistic retransmission technique, a simple UL grant for uplink opportunistic retransmission may be used. The DCI format illustrated in FIGS. 15 and 16 may be configured using the simple UL grant. The information included in the simple UL grant is as follows.

Opportunistic retransmission resource allocation information (Optional) Opportunistic retransmission process ID (PCID): The basic operation is the same as that for the downlink retransmission. However, since it is difficult to perform a plurality of opportunistic retransmissions in the uplink due to the transmission power limitation of the terminal, the PCID value is set to be optional. As an example, when there is data to be transmitted in the uplink due to the power limitation of the terminal, the opportunistic retransmission may not be performed even in the presence of the redundant radio resource. As another example, when there is data to be transmitted in the uplink, only one opportunistic retransmission may be permitted.

(Optional) Symbol mapping method of opportunistic retransmission: When the opportunistic retransmission is performed, resources not used in the corresponding TTI are generated. Therefore, it is desirable to recycle an encoded signal before that as much as possible. To this end, a transmitting terminal needs to buffer the existing signal and information on the modulation scheme and the multi input multi output (MIMO) transmission technique may be removed or minimized.

Power setting of uplink opportunistic retransmission signal: The power setting is applicable as same as the above example in the downlink. That is, it is assumed that the power ratio $\rho_A$ of the opportunistic retransmission and the general data transmission is specified through the higher layer signaling and the power reduction ratio $\rho_B$ to the previous transmission is delivered through the simple UL grant. Where $0 \leq \rho_A \leq 1$ and $0 \leq \rho_B \leq 1$. When the previous transmission of the same data is the general data transmission that is transmitted with power P, the transmission power of the opportunistic retransmission received at this time is $P\rho_A\rho_B$. When the previous transmission of the same data is the opportunistic retransmission, the transmission power of the opportunistic retransmission received at this time becomes $P\rho_B$. However, the power reduction ratio value to the previous transmission defined by the higher layer signaling may be defined separately in the uplink and the downlink.

The simple UL grant may be used for other purposes at the same time, including the opportunistic retransmission. In this case, the simple UL grant includes the following information.

DL/UL indicator: The DL/UL indicator may include an indicator whether the corresponding information is DL grant or UL grant. Herein, since the DL/UL indicator performs the downlink opportunistic retransmission technique, the DL/UL indicator may indicate the UL grant.

Resource allocation information

New data indicator (NDI): The new data indicator (NDI) is used to indicate whether data to be received or transmitted is the initial transmission data or the retransmission data.

Opportunistic retransmission indicator (ORI): The opportunistic retransmission indicator (ORI) is used to indicate whether the data to be received or transmitted is the general retransmission data or the opportunistic retransmission data. As an example, when NDI=0 and ORI=0, retransmission is performed with the general retransmission data and when NDI=0 and ORI=1, retransmission is performed with the opportunistic retransmission data. When NDI=1, the terminal recognizes an ORI value as a dummy value.

(Optional) redundancy version (RV) of retransmission signal: The (optional) redundancy version (RV) of retransmission signal indicates the RVs of the general retransmission signal and the opportunistic retransmission signal. RV values may not be used in the opportunistic retransmission.

Retransmission process ID (PCID): When ORI=0, the corresponding value indicates the PCID of the general retransmission data. When ORI=1, the corresponding value indicates the PCID of the opportunistic retransmission data. Generally, since the maximum number of processes in the opportunistic retransmission data is smaller than the number of processes in the general retransmission data, the number of bits for representing the PCID is defined as the number of processes in the general retransmission data. Bits not used in the opportunistic retransmission may be recognized as the dummy value of the terminal or used for power setting of the uplink opportunistic retransmission signal.

Modulation scheme: In case of initial transmission data or general retransmission data, a modulation coding scheme (MCS) level is selected according to the existing scheme. Even in the case of the opportunistic retransmission, the data is transmitted in the same scheme, but it is generally desirable to set the same MCS as the previous transmission in order to minimize the encoding time of the opportunistic retransmission data. Alternatively, the MCS may be configured by using the same channel code as the previous transmission, but by changing the modulation scheme.

Power setting of uplink opportunistic retransmission signal (UL PC): The power setting is applicable as same as the above example in the downlink. That is, it is assumed that the power ratio $\rho_A$ of the opportunistic retransmission and the general data transmission is specified through the higher layer signaling and the power reduction ratio $\rho_B$ to the previous transmission is delivered through the simple UL grant. Where $0 \leq \rho_A \leq 1$ and $0 \leq \rho_B \leq 1$. When the previous transmission of the same data is the general data transmission that is transmitted with power P, the transmission power of the opportunistic retransmission received at this time is $P\rho_A\rho_B$. When the previous transmission of the same data is the opportunistic retransmission, the transmission power of the opportunistic retransmission received at this time becomes $P\rho_B$. However, the power reduction ratio value to the previous transmission defined by the higher layer signaling may be defined separately in the uplink and the downlink. FIG. 15 illustrates configuration information of the DCI format when the ORI of the simple UL grant is 0 and FIG. 16 illustrates the configuration information of the DCI format when the ORI of the simple UL grant is 1. The lengths of the DCI formats in FIGS. 15 and 16 are the same as each other. In FIG. 16, the configuration information may include the power setting information (UL PC) of the opportunistic retransmission by utilizing the redundant bits in the PCID and the MCS.

The interval for transmitting the ACK/NACK signal after receiving the uplink opportunistic retransmission signal is the same as the transmission interval of the ACK/NACK signal for the general signal transmission. The transmission resource of the ACK/NACK signal for the uplink opportunistic retransmission is mapped to one of the uplink control signals corresponding to the resource that transmits the simple UL grant.

The resource for performing the uplink opportunistic retransmission is configured through inter-cell coordination. The uplink retransmission is applied in the same scheme as the downlink retransmission.

Figure 17:
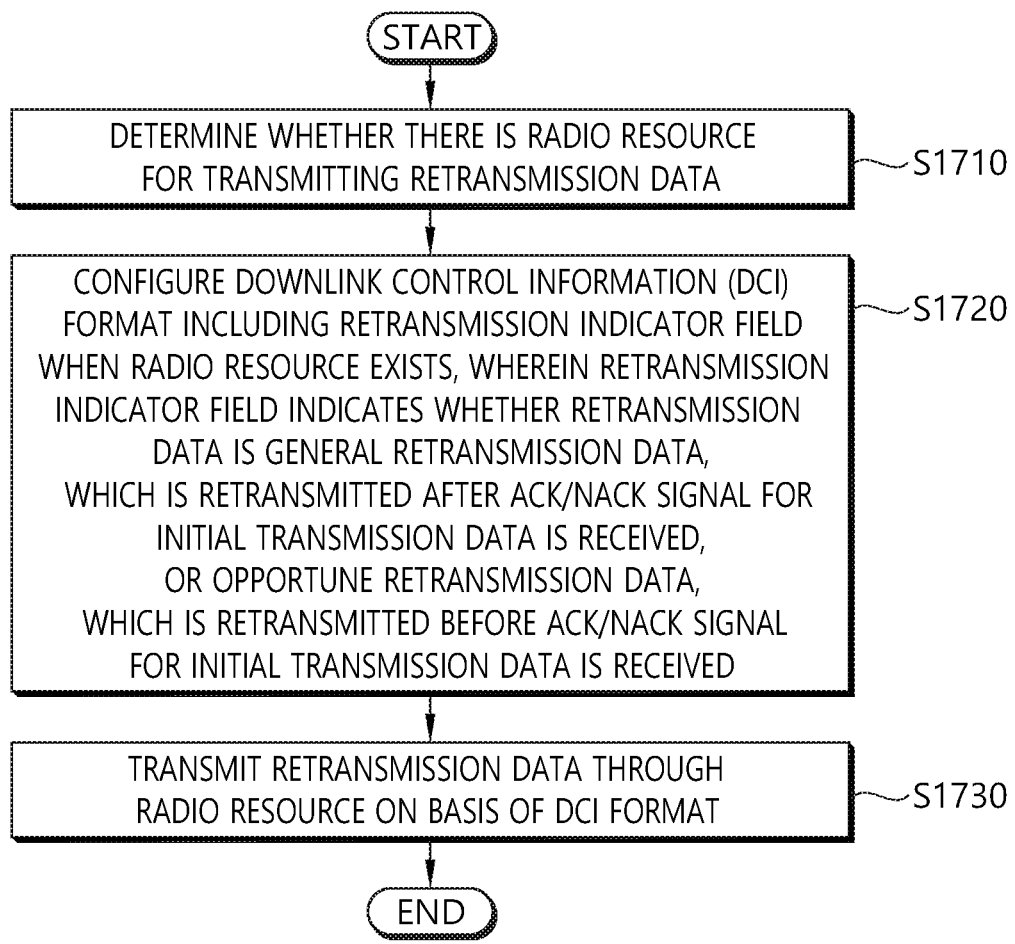
FIG. 17 is a flowchart illustrating a procedure for transmitting retransmission data using HARQ in a wireless communication system according to an embodiment of the present invention.

FIG. 17 is a flowchart illustrating a procedure for transmitting retransmission data using HARQ in a wireless communication system according to an embodiment of the present invention.

First, when terms are defined, a retransmission indicator field may be regarded as corresponding to an ORI field included in the DCI format. Therefore, the retransmission indicator field may indicate whether the retransmission data is the general retransmission data or the opportunistic retransmission data. The general retransmission data is retransmission data to be retransmitted after receiving the ACK/NACK signal for the initial transmission data and the opportunistic retransmission data is retransmission data to be retransmitted before receiving the ACK/NACK signal for the initial transmission data.

First, in step S1710, it is determined whether there is the radio resource for transmitting the retransmission data. Herein, the radio resource corresponds to the redundant radio resource and the radio resource is determined in the radio resource excluding the resource for transmitting the initial transmission data and the resource for transmitting the general retransmission data.

In step S1720, the DCI format including the retransmission indicator field is configured when there is the radio resource for transmitting the retransmission data. That is, the retransmission indicator field may be included in the DCI format to indicate the opportunistic retransmission data to be retransmitted before receiving the ACK/NACK signal.

In step S1730, the retransmission data is transmitted through the radio resource according to the scheduling of the DCI format configured in step S1720.

Figure 18:
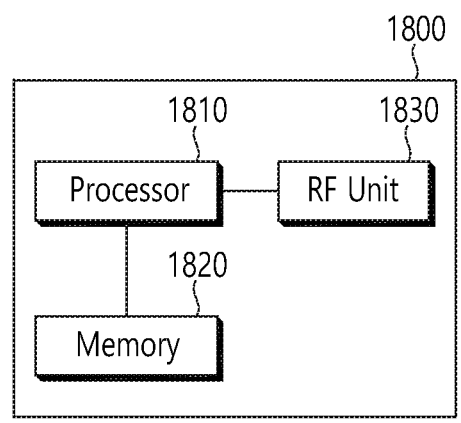
FIG. 18 is a block diagram showing an apparatus for wireless communication for implementing an embodiment of the present invention.

FIG. 18 is a block diagram showing an apparatus for wireless communication for implementing an embodiment of the present invention.

An apparatus 1000 for wireless communication includes a processor 1810, a memory 1820 and a radio frequency (RF) unit 1830.

The processor 1810 may be configured to implement proposed functions, procedures and/or methods described in this description. Layers of the radio interface protocol may be implemented in the processor 1810. The processor 1810 may handle a procedure explained above. The memory 1820 is operatively coupled with the processor 1810, and the RF unit 1830 is operatively coupled with the processor 1810.

The processor 1810 may include application-specific integrated circuit (ASIC), other chipset, logic circuit and/or data processing device. The memory 1820 may include read-only memory (ROM), random access memory (RAM), flash memory, memory card, storage medium and/or other storage device. The RF unit 1830 may include baseband circuitry to process radio frequency signals. When the embodiments are implemented in software, the techniques described herein can be implemented with modules (e.g., procedures, functions, and so on) that perform the functions described herein. The modules can be stored in memory 1820 and executed by processor 1810. The memory 1820 can be implemented within the processor 1810 or external to the processor 1810 in which case those can be communicatively coupled to the processor 1810 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for transmitting retransmission data using hybrid automatic repeat request (HARQ) by a base station in a wireless communication system, the method comprising:
   determining whether there is a radio resource for transmitting the retransmission data;
   configuring downlink control information (DCI) format including a retransmission indicator field when the radio resource exists, the retransmission indicator field indicating whether the retransmission data is general retransmission data which is retransmitted after receiving an ACK/NACK signal for initial transmission data or opportunistic retransmission data which is retransmitted before receiving the ACK/NACK signal for the initial transmission data;
   receiving index information of the radio resource in which a maximum power value of the retransmission data is limited and information on the maximum power value of the retransmission data from another base station adjacent to the base station; and
   transmitting the retransmission data through the radio resource on a basis of the DCI format.

2. The method of claim 1, wherein the DCI format further includes a process ID (PCID) field and a modulation coding scheme (MCS) field.

3. The method of claim 2, wherein the DCI format configured when the retransmission indicator field indicates that the retransmission data is the opportunistic retransmission data has a same-length bit as the DCI format configured when the retransmission indicator field indicates that the retransmission data is the general retransmission data.

4. The method of claim 2, wherein when the retransmission indicator field indicates that the retransmission data is the opportunistic retransmission data, power information for the retransmission data is transmitted using redundant bits in the PCID field and the MCS field.

5. The method of claim 4, wherein the POD field indicates the number of HARQ processes of the retransmission data and the number of HARQ processes of the retransmission data is determined according to the number of HARQ processes until receiving the ACK/NACK signal for the initial transmission data after transmitting the initial transmission data.

6. The method of claim 1, wherein the radio resource is determined in radio resources other than a resource for transmitting the initial transmission data and a resource for transmitting the general retransmission data.

7. The method of claim 1, wherein the retransmission data is transmitted by using remaining power other than power used for the initial transmission data and a power used for the general retransmission data.

8. The method of claim 1, wherein the retransmission data is transmitted using a channel code and a modulation scheme used for the initial transmission data.

9. The method of claim 1, wherein the HARQ processes of the initial transmission data and the retransmission data are performed by a unit of a shorter sTTI than a transmission time interval (TTI) corresponding to a subframe.

10. The method of claim 9, wherein when the sTTI corresponds to two symbols, a symbol interval of the ACK/NACK signal for downlink data and a symbol interval of the ACK/NACK signal for uplink data have different lengths.

11. A wireless apparatus for transmitting retransmission data using hybrid automatic repeat request (HARQ) in a wireless communication system, the apparatus comprising:
   a radio frequency (RF) unit transmitting and receiving a radio signal; and
   a processor including the RF unit, wherein the processor is configured to:
   determine whether there is a radio resource for transmitting the retransmission data;
   configure downlink control information (DCI) format including a retransmission indicator field when the radio resource exists, the retransmission indicator field indicating whether the retransmission data is general retransmission data which is retransmitted after receiving an ACK/NACK signal for initial transmission data or opportunistic retransmission data which is retransmitted before receiving the ACK/NACK signal for the initial transmission data;

receive index information of the radio resource in which a maximum power value of the retransmission data is limited and information on the maximum power value of the retransmission data from another base station adjacent to the base station; and transmits the retransmission data through the radio resource on a basis of the DCI format.

* * * * *